(12) United States Patent
Komori

(10) Patent No.: US 12,142,400 B2
(45) Date of Patent: Nov. 12, 2024

(54) WIRING MODULE AND ELASTIC WATERPROOFING MEMBER

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Hirokazu Komori, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 42 days.

(21) Appl. No.: 18/010,121

(22) PCT Filed: May 31, 2021

(86) PCT No.: PCT/JP2021/020590
§ 371 (c)(1),
(2) Date: Dec. 13, 2022

(87) PCT Pub. No.: WO2021/256231
PCT Pub. Date: Dec. 23, 2021

(65) Prior Publication Data
US 2023/0317316 A1    Oct. 5, 2023

(30) Foreign Application Priority Data

Jun. 19, 2020 (JP) ................................. 2020-106246

(51) Int. Cl.
*H01B 7/282* (2006.01)
*H02G 1/14* (2006.01)
(Continued)

(52) U.S. Cl.
CPC ............... *H01B 7/282* (2013.01); *H02G 1/14* (2013.01); *H02G 15/013* (2013.01); *H02G 15/04* (2013.01)

(58) Field of Classification Search
CPC . H01B 7/00; H01B 7/282; H02G 1/14; H02G 15/013; H02G 15/04; H02G 15/046
See application file for complete search history.

(56) References Cited

U.S. PATENT DOCUMENTS 2,722,667 A * 11/1955 Huston ................ H01R 13/627
   439/372
4,611,872 A *  9/1986 Ito ...................... H01R 13/5219
   439/587
(Continued)

FOREIGN PATENT DOCUMENTS

DE     10349440 A1 *  6/2005 .............. F16L 5/027
JP    2014-143889 A     8/2014

OTHER PUBLICATIONS

International Search Report issued on Aug. 24, 2021 for WO 2021/256231 A1 (4 pages).

*Primary Examiner* — Timothy J Thompson
*Assistant Examiner* — Rhadames Alonzo Miller
(74) *Attorney, Agent, or Firm* — Venjuris, P.C.

(57) ABSTRACT

One object is to be able to easily attach an elastic waterproofing member to a wiring member. A wiring module (10) includes a wiring member (20), and an elastic waterproofing member (30, 130, 230, 330) in which a penetration accommodating portion (32) is formed that is capable of accommodating a portion in a longitudinal direction of the wiring member. The elastic waterproofing member includes a first split waterproofing member (36, 136) and a second split waterproofing member (38, 138), the first split waterproofing member and the second split waterproofing member are obtained by splitting the elastic waterproofing member so as (Continued)

to longitudinally split the penetration accommodating portion, and the first split waterproofing member and the second split waterproofing member are kept in a joined state, with a portion in a longitudinal direction of the wiring member accommodated in the penetration accommodating portion.

12 Claims, 9 Drawing Sheets

(51) Int. Cl.
*H02G 15/013* (2006.01)
*H02G 15/04* (2006.01)

(56) References Cited

U.S. PATENT DOCUMENTS

| | | | | |
|---|---|---|---|---|
| 5,927,725 | A * | 7/1999 | Tabata | H01R 13/5205 174/152 G |
| 6,368,132 | B1 * | 4/2002 | Okayasu | H01R 13/5219 439/275 |
| 7,229,325 | B1 * | 6/2007 | Flynn | H01R 9/223 439/798 |
| 2002/0052141 | A1 * | 5/2002 | Hattori | H01R 13/5205 439/587 |
| 2002/0101041 | A1 * | 8/2002 | Kameyama | H01R 13/521 277/628 |
| 2003/0121691 | A1 * | 7/2003 | Inoue | F16L 37/0987 174/650 |
| 2003/0184088 | A1 * | 10/2003 | Takayanagi | F16L 37/0987 285/319 |
| 2003/0184089 | A1 * | 10/2003 | Takayanagi | F16L 37/0987 285/319 |
| 2004/0061332 | A1 * | 4/2004 | Takayanagi | F16L 37/0847 285/330 |
| 2004/0066034 | A1 * | 4/2004 | Takayanagi | F16L 3/1226 285/319 |
| 2004/0266270 | A1 * | 12/2004 | Miyazaki | H01R 4/46 439/660 |
| 2007/0207668 | A1 * | 9/2007 | Masuzaki | G02B 6/3897 439/587 |
| 2007/0267212 | A1 * | 11/2007 | Nachbauer | H01R 29/00 174/70 R |
| 2008/0014793 | A1 * | 1/2008 | Okumura | H01R 13/5205 439/587 |
| 2009/0176416 | A1 * | 7/2009 | Flynn | H01R 13/5216 439/798 |
| 2012/0149243 | A1 * | 6/2012 | Ohnishi | H01R 43/24 29/883 |
| 2012/0156927 | A1 * | 6/2012 | Shiga | H01R 13/5208 439/521 |
| 2014/0099810 | A1 * | 4/2014 | Scott | H01R 13/6273 439/183 |
| 2014/0335739 | A1 * | 11/2014 | Sato | H01R 13/641 439/680 |
| 2015/0140851 | A1 * | 5/2015 | Wang | H01R 13/6597 439/275 |
| 2015/0303592 | A1 * | 10/2015 | Tait | H01R 4/26 439/391 |
| 2016/0236125 | A1 * | 8/2016 | Umeno | H05K 5/0213 |
| 2017/0149170 | A1 * | 5/2017 | Tait | H01R 13/506 |
| 2017/0162299 | A1 * | 6/2017 | Komori | H01R 13/52 |
| 2018/0048108 | A1 * | 2/2018 | Takahashi | H01R 13/6463 |
| 2020/0194930 | A1 * | 6/2020 | Yamada | H01R 13/6215 |
| 2020/0224767 | A1 * | 7/2020 | Chikamatsu | F16J 15/3232 |
| 2020/0254944 | A1 * | 8/2020 | Hashimoto | B60R 16/0207 |
| 2022/0035102 | A1 * | 2/2022 | Zhu | G02B 6/3894 |

* cited by examiner

WIRING MODULE AND ELASTIC WATERPROOFING MEMBER

CROSS REFERENCE TO RELATED APPLICATIONS

This application is a national phase of PCT application No. PCT/JP2021/020590, filed on 31 May 2021, which claims priority from Japanese patent application No. 2020-106246, filed on 19 Jun. 2020, all of which are incorporated herein by reference.

TECHNICAL FIELD

The present disclosure relates to a wiring module and an elastic waterproofing member.

BACKGROUND

Patent Document 1 discloses a rubber plug applied to a multi-core cable. The rubber plug has a sheath outer-fitting portion externally fitted on an end of a sheath in the multi-core cable, and has a wire penetration portion having a plurality of through holes penetrated by a plurality of electric wires led out from the end of the sheath.

PRIOR ART DOCUMENT

Patent Document

Patent Document 1: JP 2016-010303 A

SUMMARY OF THE INVENTION

Problems to be Solved

As disclosed in Patent Document 1, a configuration in which electric wires penetrate through holes in a rubber plug is adopted to inhibit the ingress of water along a multi-core cable.

Here, it is desired that the wiring member can be easily passed through the through holes of the elastic waterproofing member.

Accordingly, one object of the present disclosure is to be able to easily attach an elastic waterproofing member to a wiring member.

Means to Solve the Problem

A wiring module of the present disclosure is a wiring module including a wiring member, and an elastic waterproofing member in which a penetration accommodating portion is formed that is capable of accommodating a portion in a longitudinal direction of the wiring member, in which the elastic waterproofing member includes a first split waterproofing member and a second split waterproofing member, the first split waterproofing member and the second split waterproofing member are obtained by splitting the elastic waterproofing member so as to longitudinally split the penetration accommodating portion, and the first split waterproofing member and the second split waterproofing member are kept in a joined state, with a portion in the longitudinal direction of the wiring member accommodated in the penetration accommodating portion.

An elastic waterproofing member of the present disclosure is an elastic waterproofing member attached to a wiring member, in which a penetration accommodating portion is formed that is capable of accommodating a portion in a longitudinal direction of the wiring member, and the elastic waterproofing member includes a first split waterproofing member and a second split waterproofing member obtained by splitting the elastic waterproofing member so as to longitudinally split the penetration accommodating portion.

Effect of the Invention

According to the present disclosure, an elastic waterproofing member is easily attached to a wiring member.

DETAILED DESCRIPTION TO EXECUTE THE INVENTION

Description of Embodiments of Present Disclosure

Figure 1:
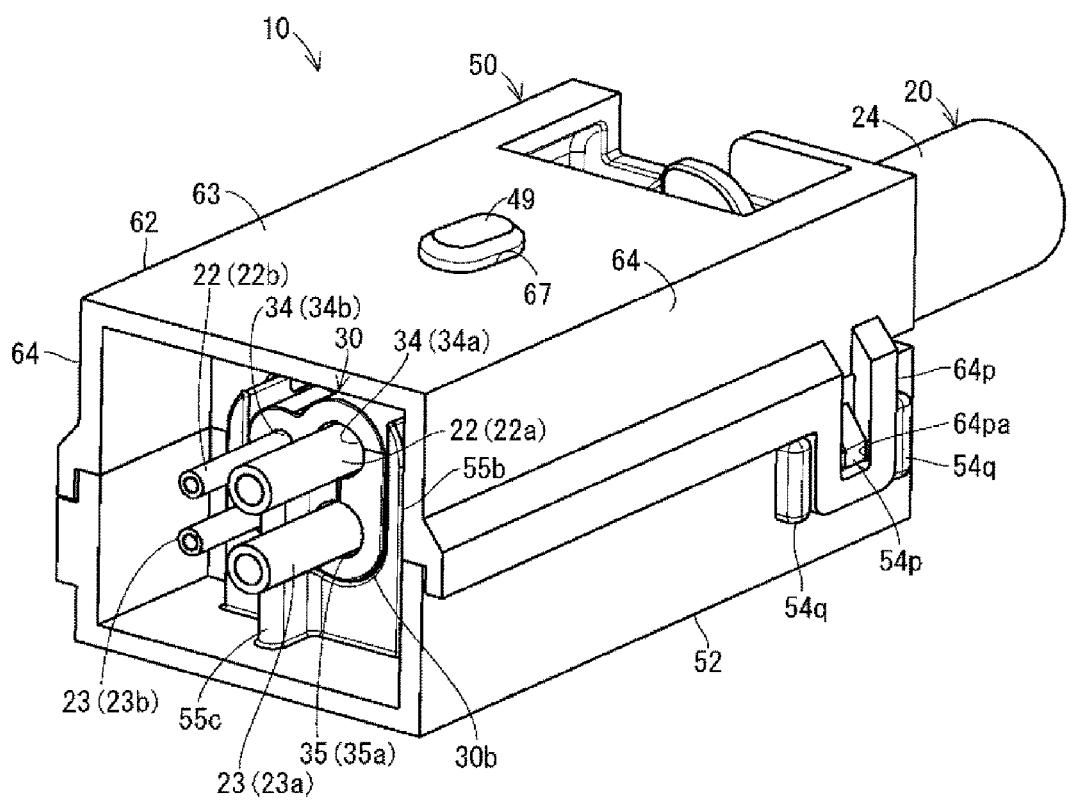
FIG. 1 is a perspective view showing a wiring module.

First, embodiments of the present disclosure will be listed and described.

A wiring module of the present disclosure is as follows.

(1) A wiring module including: a wiring member; and an elastic waterproofing member in which a penetration accommodating portion is formed that is capable of accommodating a portion in a longitudinal direction of the wiring member, in which the elastic waterproofing member includes a first split waterproofing member and a second split waterproofing member, the first split waterproofing member and the second split waterproofing member are obtained by splitting the elastic waterproofing member so as to longitudinally split the penetration accommodating portion, and the first split waterproofing member and the second split waterproofing member are kept in a joined state, with a portion in the longitudinal direction of the wiring member accommodated in the penetration accommodating portion. According to the present disclosure, with the first split waterproofing member and the second split waterproofing member split from each other, a portion in the longitudinal direction of the wiring member can be accommodated in the longitudinally-split penetration accommodating portion. Subsequently, the elastic waterproofing member can be easily attached to the wiring member by joining the first split waterproofing member and the second split waterproofing member together.

(2) In the wiring module of (1), at least one of the first split waterproofing member and the second split waterproofing member may include a peripheral surface portion exceeding a semicircle, as a portion where the penetration accommodating portion is longitudinally split. As a result, when linear wiring members or the like included in the wiring member are provisionally held in the peripheral surface portion, the first split waterproofing member and the second split waterproofing member can be easily joined together.

(3) In the wiring module of (1) or (2), the wiring member may include a plurality of linear wiring members and a covering member that covers the plurality of linear wiring members, and the plurality of linear wiring members may extend from an end of the covering member, the penetration accommodating portion may include a covering member accommodating recess that covers the end of the covering member and a plurality of penetration portions continuous with the covering member accommodating recess, the plurality of penetration portions may be provided so as to correspond to the plurality of linear wiring members, and the elastic waterproofing member may be split into the first split waterproofing member and the second split waterproofing member so as to split a portion from the covering member accommodating recess to the plurality of penetration portions. In this case, with the first split waterproofing member and the second split waterproofing member split from each other, the portion from the covering member accommodating recess to the plurality of penetration portions is split. Therefore, the end of the covering member and the portions of the plurality of linear wiring members that are close to the covering member can be easily accommodated in the covering member accommodating recess and the plurality of penetration portions.

(4) In the wiring module of any one of (1) to (3), the wiring member may include a linear wiring member and a deep-side linear wiring member, and the penetration accommodating portion may include a penetration portion capable of accommodating a portion in a longitudinal direction of the linear wiring member, and a deep-side penetration portion capable of accommodating a portion in a longitudinal direction of the deep-side linear wiring member, the elastic waterproofing member may be split such that the deep-side penetration portion is provided in the first split waterproofing member, and a slit may be formed in the first split waterproofing member from the penetration portion to the deep-side penetration portion. As a result, the deep-side linear wiring member can, through the slit, be disposed in the deep-side penetration portion, which is located on the deep side with respect to the portion where the first split waterproofing member and the second split waterproofing member are split.

(5) The wiring module of any one of (1) to (4) may further include an exterior member including a first exterior member and a second exterior member that can be joined together, in which when the first exterior member and the second exterior member are joined together, the first split waterproofing member and the second split waterproofing member may be joined together and accommodated between the first exterior member and the second exterior member. By joining the first exterior member and the second exterior member together, the first split waterproofing member and the second split waterproofing member are kept in a joined state.

(6) In the wiring module of (5), the first exterior member may hold the first split waterproofing member with a split surface of the first split waterproofing member exposed. In this case, the wiring member can be provisionally held in the first split waterproofing member, which is held in the first exterior member, with ease.

(7) In the wiring module of (6), the second exterior member may hold the second split waterproofing member with a split surface of the second split waterproofing member exposed. In this case, by joining the first exterior member and the second exterior member together, the first split waterproofing member and the second split waterproofing member can be easily joined together.

(8) In the wiring module of (7), a first set protrusion may be formed on one of the first split waterproofing member and the first exterior member, and a first set recess in which the first set protrusion may be fitted in a first position may be formed in the other, and a second set protrusion may be formed on one of the second split waterproofing member and the second exterior member, and a second set recess in which the second set protrusion may be fitted in a second position may be formed in the other. In this case, the first split waterproofing member is set in a predetermined position with respect to the first exterior member. Furthermore, the second split waterproofing member is set in a predetermined position with respect to the second exterior member. As a result, by joining the first exterior member and the second exterior member together in a correct position, the first split waterproofing member and the second split waterproofing member can be joined together in a correct position.

Furthermore, an elastic waterproofing member of the present disclosure is as follows:

(9) An elastic waterproofing member to be attached to a wiring member, in which a penetration accommodating portion is formed that is capable of accommodating a portion in a longitudinal direction of the wiring member, and the elastic waterproofing member includes a first split waterproofing member and a second split waterproofing member obtained by splitting the elastic waterproofing member so as to longitudinally split the penetration accommodating portion. According to the present disclosure, with the first split waterproofing member and the second split waterproofing member split from each other, a portion in the longitudinal direction of the wiring member can be accommodated in the longitudinally-split penetration accommodating portion. Subsequently, the elastic waterproofing member can be easily attached to the wiring member by joining the first split waterproofing member and the second split waterproofing member together.

(10) In the elastic waterproofing member of (9), at least one of the first split waterproofing member and the second split waterproofing member may include a peripheral surface portion exceeding a semicircle, as a portion where the penetration accommodating portion is longitudinally split. Since at least one of the first split waterproofing member and the second split waterproofing member includes a peripheral surface portion exceeding a semicircle as a longitudinally split portion of the penetration accommodating portion, with linear wiring members included in the wiring member provisionally held in that peripheral surface portion, the first split waterproofing member and the second split waterproofing member can be easily joined together.

(11) In the elastic waterproofing member of (9) or (10), the penetration accommodating portion may include a covering member accommodating recess that is open on one side and a plurality of penetration portions continuous with a deep side of the covering member accommodating recess, and the elastic waterproofing member may be split into the first split waterproofing member and the second split waterproofing member so as to split a portion from the covering member accommodating recess to the plurality of penetration portions. With the first split waterproofing member and the second split waterproofing member split from each other, the portion from the covering member accommodating recess to the plurality of penetration portions is split. Therefore, an end of the covering member and the portions of the plurality of linear wiring members that are close to the covering member can be easily accommodated in the covering member accommodating recess and the plurality of penetration portions.

(12) In the elastic waterproofing member of any one of (9) to (11), the penetration accommodating portion may include a penetration portion capable of accommodating a portion in a longitudinal direction of a linear wiring member of the wiring member, and a deep-side penetration portion capable of accommodating a portion in a longitudinal direction of a linear wiring member different from the linear wiring member of the wiring member, the elastic waterproofing member may be split such that the deep-side penetration portion is provided in the first split waterproofing member, and a slit may be formed in the first split waterproofing member from the penetration portion to the deep-side penetration portion. A slit is formed from the penetration portion to the deep-side penetration portion. As a result, the deep-side linear wiring member can be disposed in the deep-side penetration portion, which is located on the deep side with respect to the portion where the first split waterproofing member and the second split waterproofing member are split.

DETAILS OF EMBODIMENTS OF PRESENT DISCLOSURE

Specific examples of the wiring module and the elastic waterproofing member of the present disclosure will be described below with reference to the drawings. The present disclosure is not limited by these examples but is indicated by the claims, and all changes that come within the claims and the meaning and range of equivalency of the claims are intended to be encompassed within the scope of the invention.

Embodiments

Figure 2:
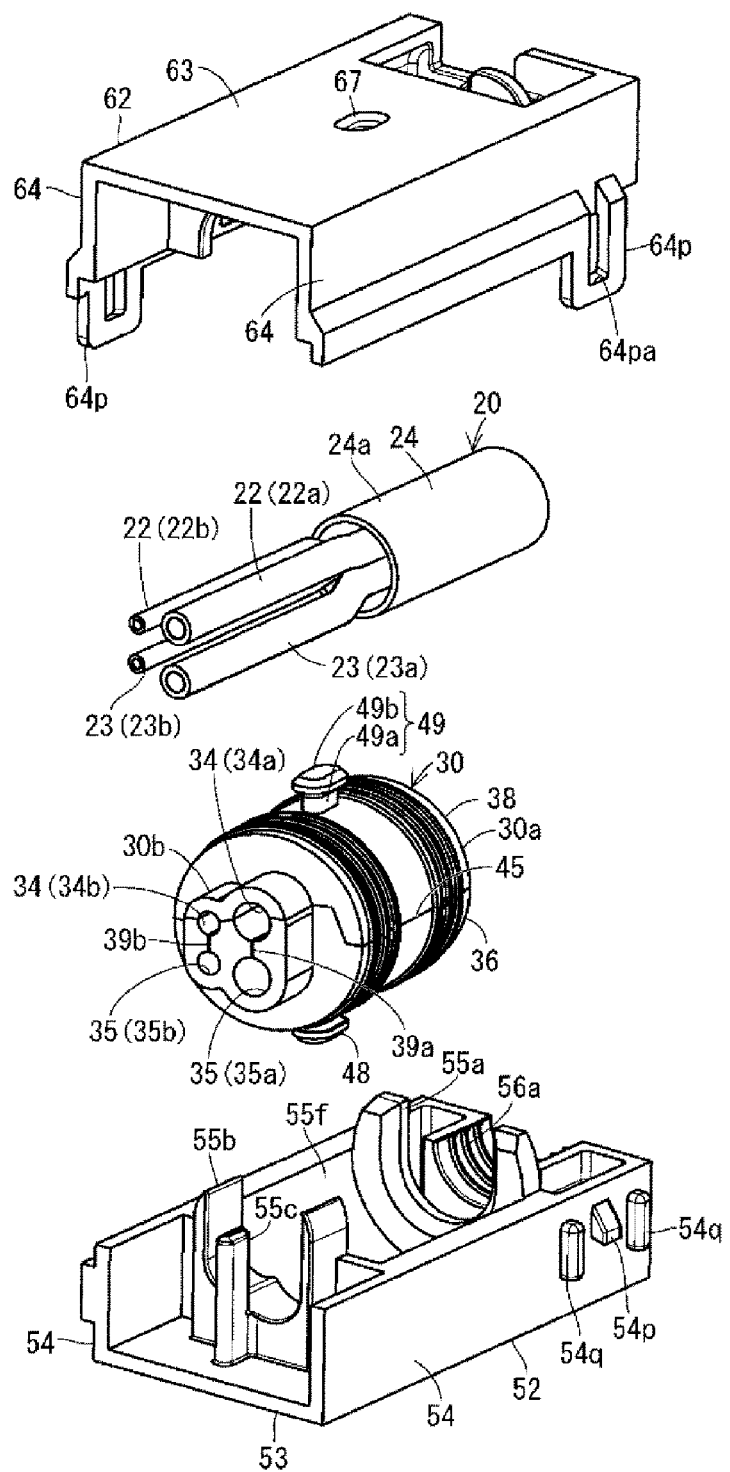
FIG. 2 is an exploded perspective view showing the wiring module.
Figure 3:
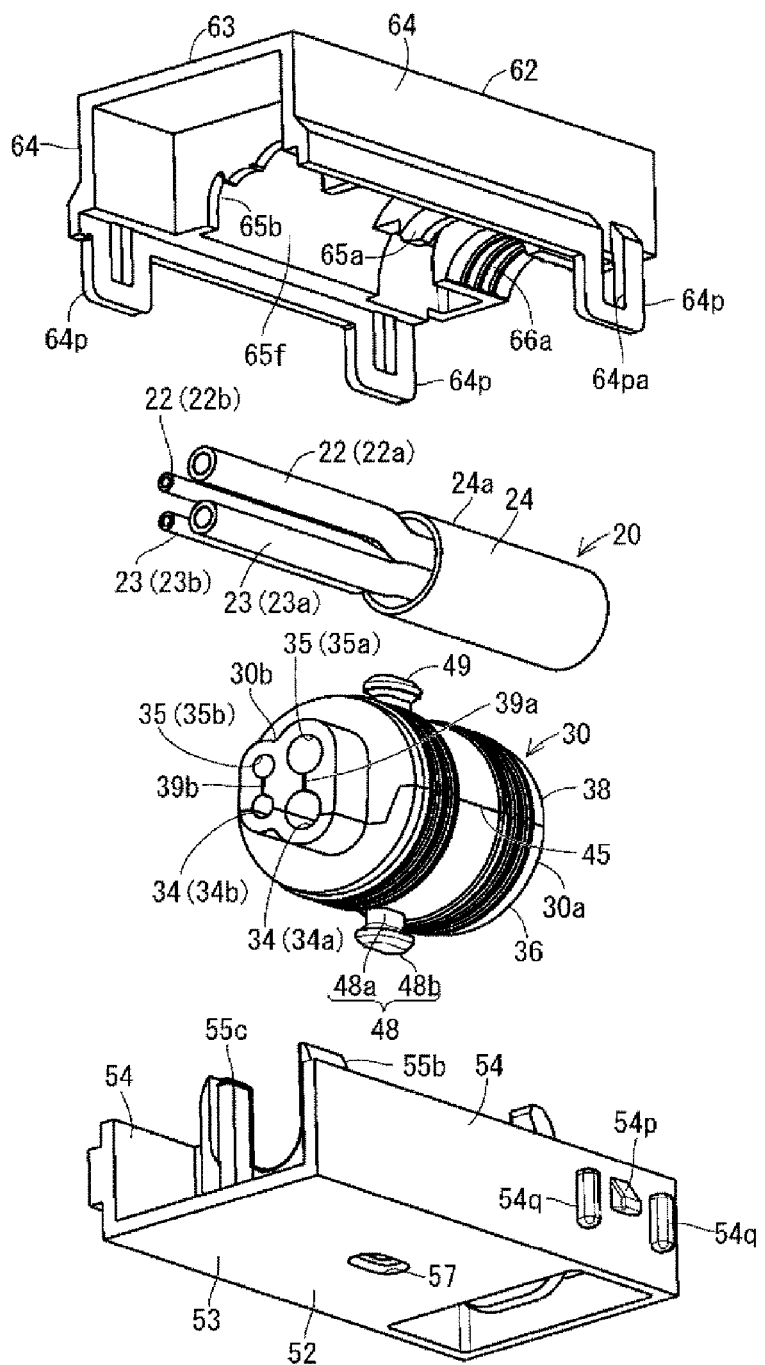
FIG. 3 is an exploded perspective view showing the wiring module.

A wiring module and an elastic waterproofing member according to an embodiment will be described hereinafter. FIG. 1 is a perspective view showing the wiring module 10. FIGS. 2 and 3 are exploded perspective views showing the wiring module 10. FIG. 2 is a perspective view from the side of a second exterior member 62, and FIG. 3 is a perspective view seen from the side of a first exterior member 52. In each figure, part of the wiring member 20 is shown.

The wiring module 10 includes a wiring member 20 and an elastic waterproofing member 30. In the present embodiment, the wiring module 10 also includes an exterior member 50. The wiring member 20 penetrates the elastic waterproofing member 30. The elastic waterproofing member 30 inhibits the ingress of water along the periphery of the wiring member 20. The elastic waterproofing member 30 is accommodated in the exterior member 50. In this way, the wiring member 20 is kept in a state of penetrating the elastic waterproofing member 30.

The following describes the configurations of the members.

The wiring member 20 includes linear wiring members 22. The wiring member 20 may include one linear wiring member 22 or a plurality of linear wiring members 22. In the present embodiment, an example is described in which the wiring member 20 includes a plurality (two in this case) of linear wiring members 22. The wiring member 20 further includes deep-side linear wiring members 23. Here, an example is described in which the wiring member 20 includes a plurality (two in this case) of deep-side linear wiring members 23. One linear wiring member 22 and one deep-side linear wiring member 23 may be provided in the wiring member 20. The deep-side linear wiring members 23 may be omitted.

The linear wiring members 22 and the deep-side linear wiring members 23 are linear media that transmit electricity, and are, for example, electric wires with a core wire and a covering that covers the core wire. In present embodiment, an example will be described in which the linear wiring members 22 and the deep-side linear wiring members 23 are general electric wires. The linear wiring members and the deep-side linear wiring members may be cables in which a plurality of electric wires are covered with a sheath. The linear wiring members and the deep-side linear wiring members may have an electromagnetic shielding layer that is braided or the like. The linear wiring members and the deep-side linear wiring members may be coaxial cables in which the periphery of an inner conductor is covered by an outer conductor whose periphery is covered by a sheath. The linear wiring members and the deep-side linear wiring members may be signal lines or power lines.

In the present embodiment, the plurality of linear wiring members 22 include linear wiring members with different thicknesses from each other. In the following description, for convenience of description, they are sometimes distinguished as a thicker linear wiring member 22a and a thinner linear wiring member 22b. The plurality of deep-side linear wiring members 23 includes deep-side linear wiring members of different thicknesses from each other. In the following description, for convenience of description, they are sometimes distinguished as a thicker deep-side linear wiring member 23a and a thinner deep-side linear wiring member 23b. Note that the thicker linear wiring member 22a and the thicker deep-side linear wiring member 23a are of the same thickness. Additionally, the thinner linear wiring member 22b and the thinner deep-side linear wiring member 23b are of the same thickness. Each of the linear wiring members and the deep-side linear wiring members may have any thickness.

The wiring member 20 includes a covering member 24 that covers portions in the direction of extension of the plurality of linear wiring members 22. The covering member 24 additionally covers portions in the direction of extension of the plurality of deep-side linear wiring members 23. The covering member 24 is, for example, a sheath formed through extrusion coating or the like of a softened and melted resin around the linear wiring members 22 and the deep-side linear wiring members 23. The covering 24 need only partially cover portions of the linear wiring members 22 and the deep-side linear wiring members 23 in the direction of extension. For example, the covering member 24 may be an adhesive tape spirally wound around and overlapping on the linear wiring members 22 and the deep-side linear wiring members 23. The covering member 24 may be a corrugated tube, a resin tube, a resin sheet, or the like, which covers the linear wiring members 22 and the deep-side linear wiring members 23. The portions of the linear wiring members 22 and the deep-side linear wiring members 23 covered by the covering member 24 are kept bundled by the covering member 24.

The plurality of linear wiring members 22 extends from one end of the covering member 24. The deep-side linear wiring members 23 also extend from the end of the covering member 24. In the present embodiment, two linear wiring members 22a and 22b extend from the end of the covering member 24, and two deep-side linear wiring members 23a and 23b also extend therefrom.

Figure 4:
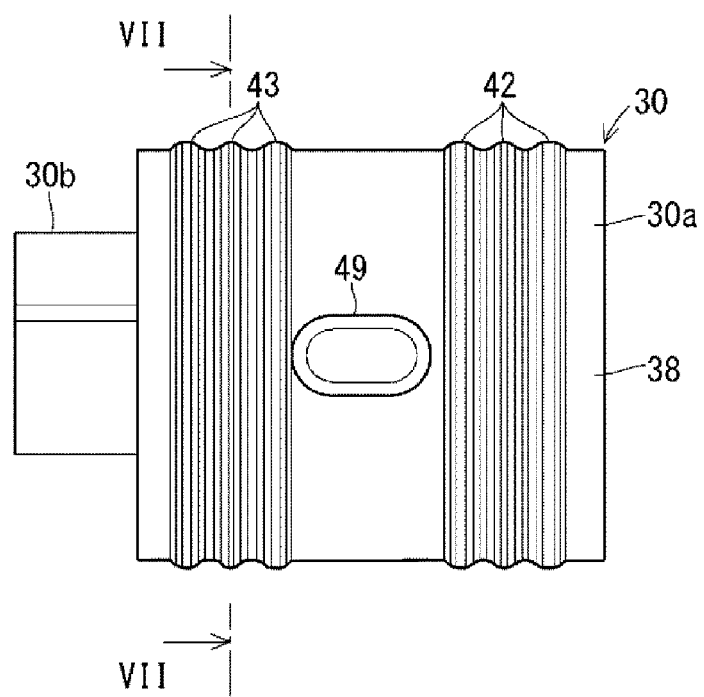
FIG. 4 is a plan view showing an elastic waterproofing member.
Figure 5:
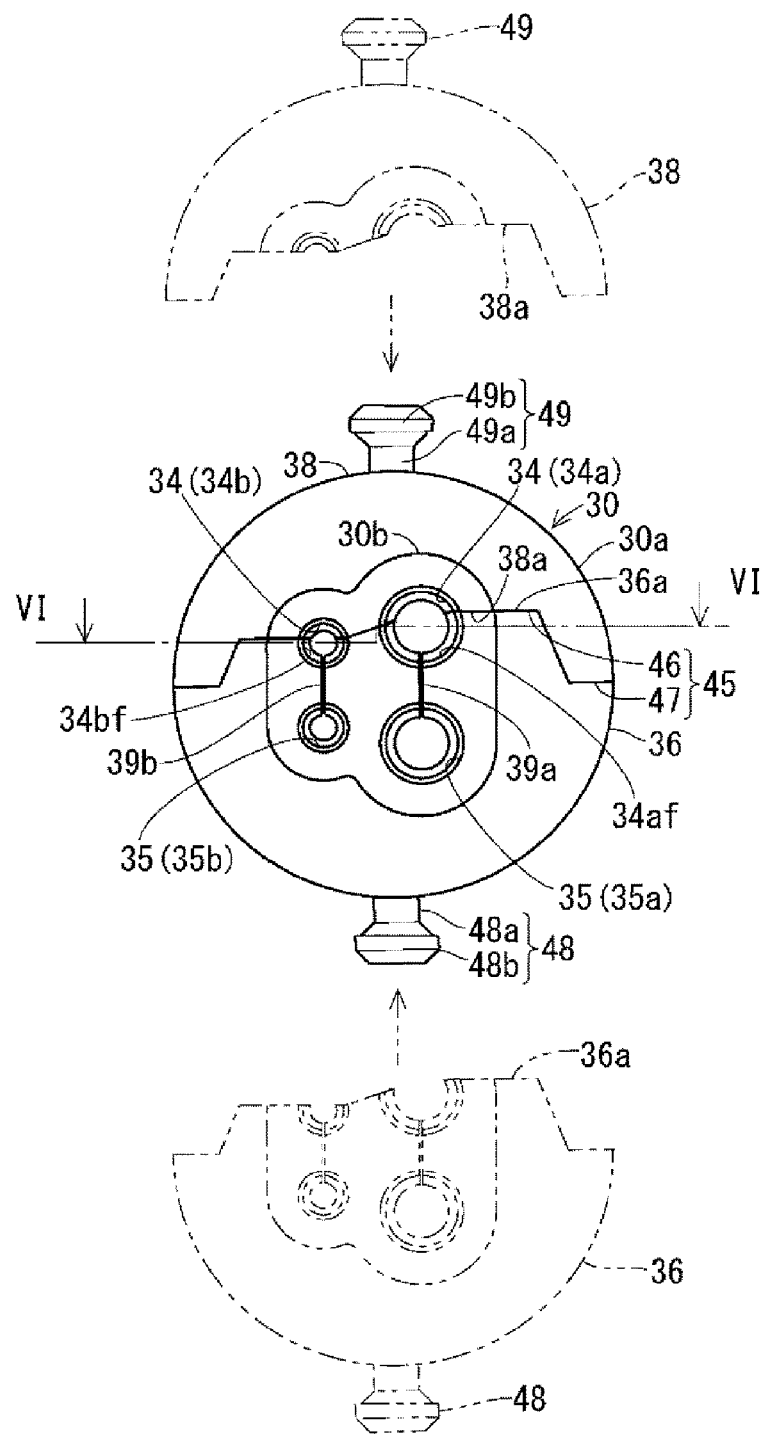
FIG. 5 is a front view showing the elastic waterproofing member.
Figure 6:
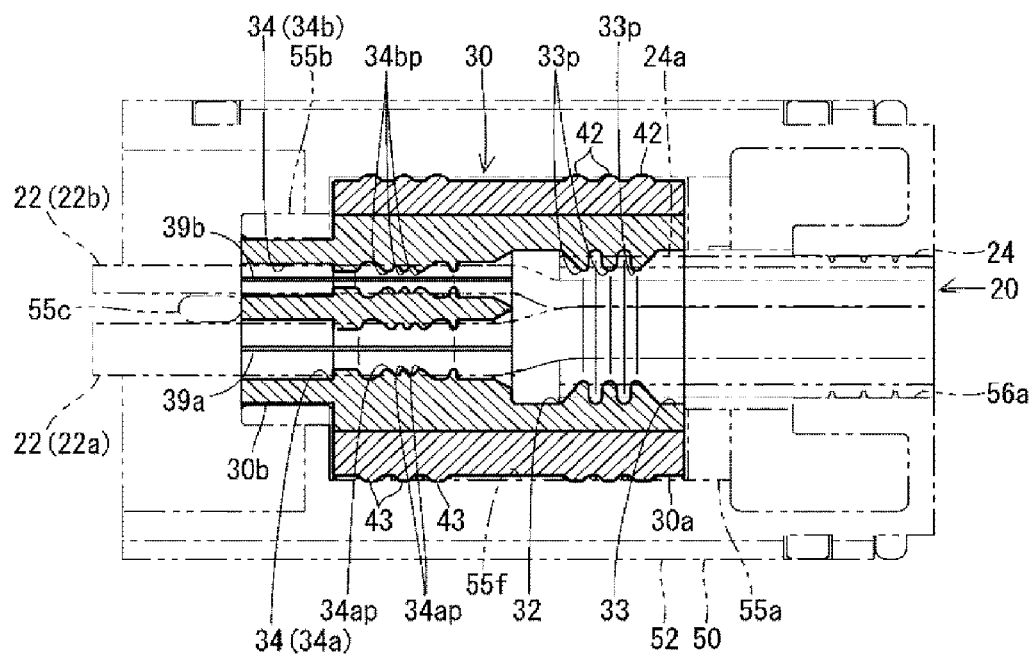
FIG. 6 is a cross-sectional view taken along line VI-VI of FIG. 5.
Figure 7:
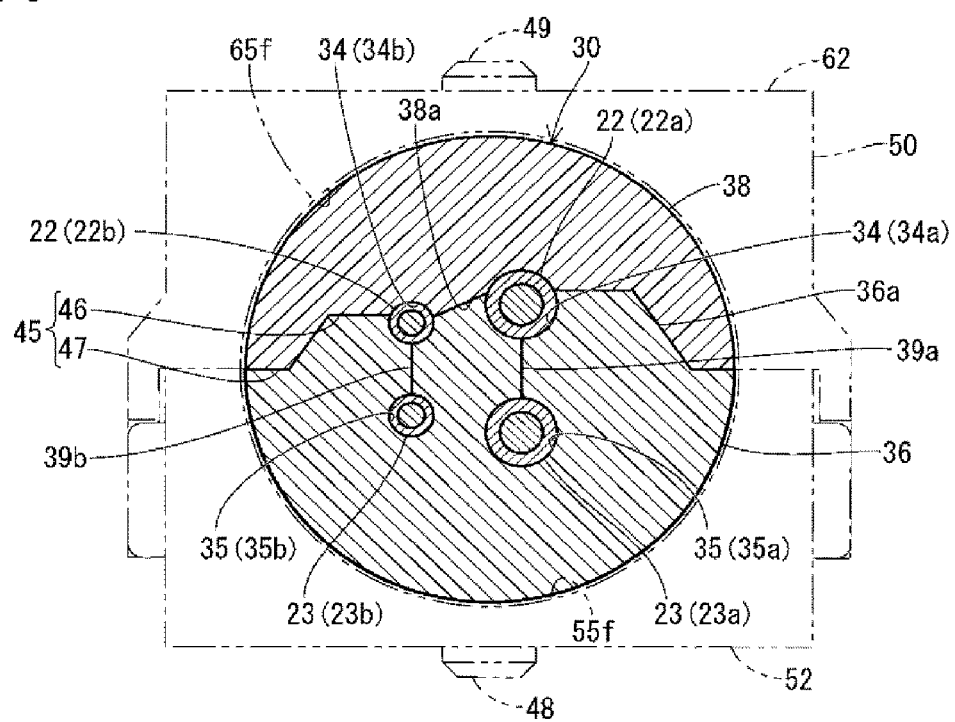
FIG. 7 is a cross-sectional view taken along line VII-VII of FIG. 4.
Figure 8:
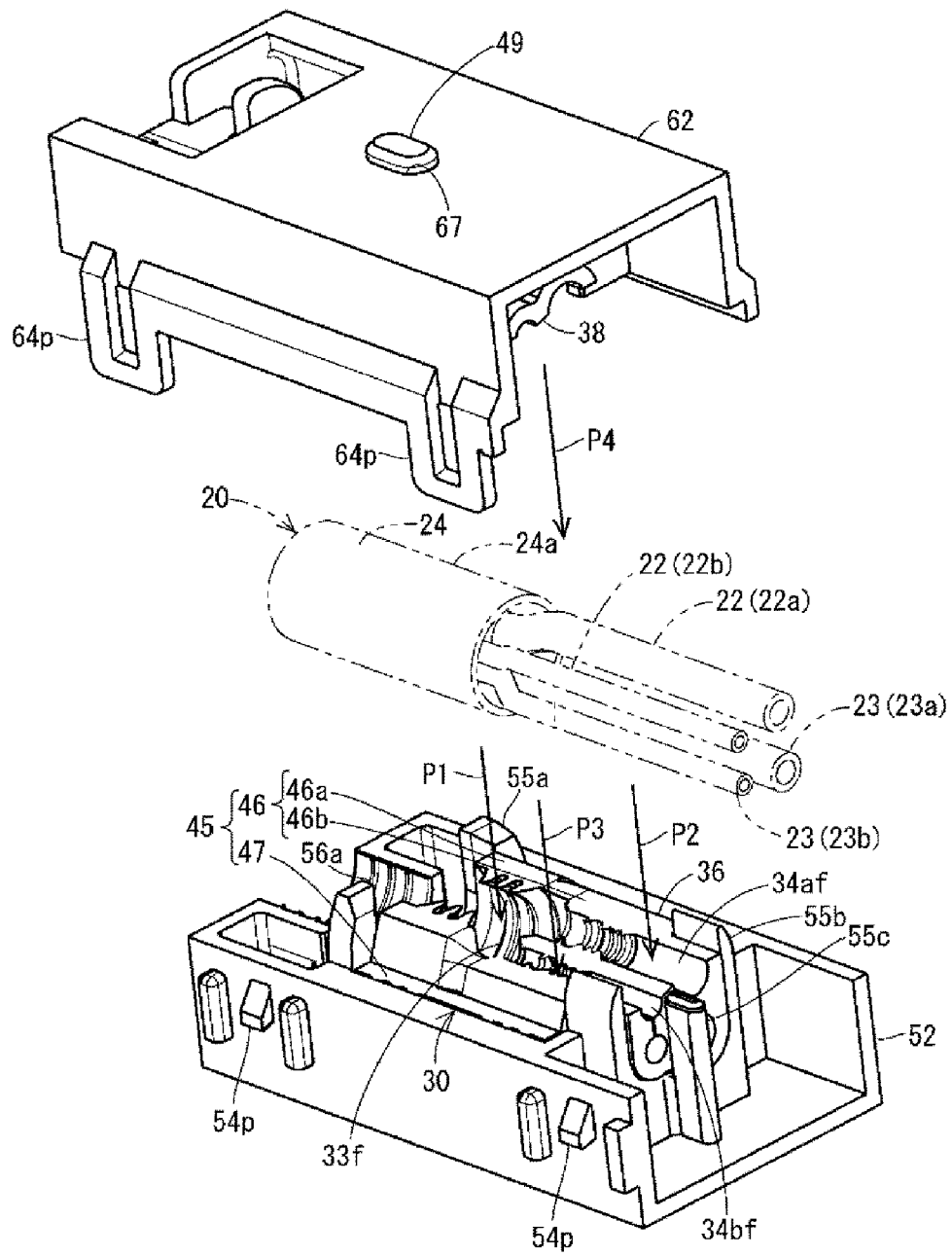
FIG. 8 is a perspective view showing an example of the process of manufacturing the wiring module.

FIG. 4 is a plan view showing the elastic waterproofing member 30. FIG. 5 is a front view showing the elastic waterproofing member 30. FIG. 6 is a cross-sectional view taken along line VI-VI of FIG. 5. FIG. 7 is a cross-sectional view taken along line VII-VII of FIG. 4. FIG. 8 is a perspective view showing an example of the process of manufacturing the wiring module 10. In FIG. 5, approximate shapes of a first split waterproofing member 36 and a second split waterproofing member 38 before being joined together are indicated by two-dot chain lines. In FIG. 6, the exterior member 50 is indicated by two-dot chain lines. FIG. 7 shows a cross-section of the wiring member 20 accommodated in the penetration accommodating portion 32 with the exterior member 50 shown in two-dot chain lines.

The overall configuration of the elastic waterproofing member 30 is described below. As shown in FIGS. 1 to 8, the elastic waterproofing member 30 is made of an elastic material such as silicone rubber. In the present embodiment, the elastic waterproofing member 30 is formed in a cylindrical shape. More specifically, the elastic waterproofing member 30 includes a cylindrical portion 30a and an extension portion 30b. The extension portion 30b is formed on the portion from which the linear wiring members 22 and the deep-side linear wiring members 23 extend with respect to the cylindrical portion 30a. The extension portion 30b is thinner than the cylindrical portion 30a. Here, the transverse cross-section of the cylindrical portion 30a (a cross-section on a plane perpendicular to the axis of the cylindrical portion 30a) is formed in a circular shape. The transverse cross-section of the extension portion 30b is formed in a shape obtained by conjoining two ovoid portions such that they overlap each other. One of the ovoid portions defining the outer peripheral surface of the extension portion 30b is larger than the other ovoid portion. The elastic waterproofing member 30 may also be formed in the shape of an elliptical column or a rectangular cylinder. The penetration accommodating portion 32 is formed in the elastic waterproofing member 30 (see FIG. 6). The penetration accommodating portion 32 penetrates the elastic waterproofing member 30 along the axial direction. The penetration accommodating portion 32 is configured to be able to accommodate a portion in the longitudinal direction of the wiring member 20.

In the present embodiment, an end 24a of the covering member 24 of the wiring member 20 and the portions of the linear wiring members 22 and the deep-side linear wiring members 23 that extend from the end 24a of the covering member 24 are accommodated in the elastic waterproofing member 30.

More specifically, the penetration accommodating portion 32 includes a covering member accommodating recess 33 and a plurality of penetration portions 34. In the present embodiment, the penetration accommodating portion 32 includes a plurality of deep-side penetration portions 35.

The covering member accommodating recess 33 is formed in a shape that covers the end 24a of the covering member 24. More specifically, the covering member accommodating recess 33 is formed as a cylindrical space recessed from one end in the axial direction of the elastic waterproofing member 30. Annular protrusions 33p protruding from the inner periphery are formed on the inner peripheral portion of the covering member accommodating recess 33 (see FIG. 6). The annular protrusions 33p are portions sometimes referred to as lips. The inner diameter of the annular protrusions 33p is formed smaller than the outer diameter of the covering member 24. Here, a plurality of (three) annular protrusions 33p are formed so as to be spread out in the axial direction of the covering member accommodating recess 33.

When the end 24a of the covering member 24 of the wiring member 20 is accommodated in the covering member accommodating recess 33, the leading end portions of the annular protrusions 33p come into areal contact with the periphery of the end 24a while being elastically deformed. As a result, it is possible to inhibit the movement of water along the outer peripheral surface of the covering portion 24.

The plurality of penetration portions 34 are through holes provided continuously with the covering member accommodating recess 33. Here, the plurality of penetration portions 34 are holes penetrating from the bottom of the covering member accommodating recess 33 to the other end of the elastic waterproofing member 30. The plurality of penetration portions 34 are provided so as to correspond to the plurality of linear wiring members 22. Here, two parallel penetration portions 34 are provided so as to correspond to the two linear wiring members 22. In the following description, the penetration portions are distinguished from each other using reference signs in some cases, with the penetration portion corresponding to the thicker linear wiring member 22a being referred to as the penetration portion 34a, and the penetration portion corresponding to the thinner linear wiring member 22b being referred to as the penetration portion 34b. The penetration portion 34a is larger than the penetration portion 34b.

Annular protrusions 34ap protruding toward the inner peripheral side are formed on the inner peripheral portion of the penetration portion 34a (see FIG. 6). The annular protrusions 34ap are portions sometimes referred to as lips. The inner diameter of the annular protrusions 34ap is formed smaller than the outer diameter of the linear wiring member 22a. Here, a plurality of annular protrusions 34ap are formed so as to be spread out in the axial direction of the penetration portion 34a. When the portion of the linear wiring member 22a on the covering member 24 side is accommodated in the penetration portion 34a, the leading end portions of the annular protrusions 34ap come into areal contact with the periphery of the linear wiring member 22a while being elastically deformed. As a result, it is possible to inhibit the movement of water along the outer peripheral surface of the linear wiring member 22a.

Similarly, annular protrusions 34bp protruding toward the inner peripheral side are formed on the inner peripheral portion of the penetration portion 34b (see FIG. 6). The annular protrusions 34*bp* are portions sometimes referred to as lips. The inner diameter of the annular protrusions 34*bp* is formed smaller than the outer diameter of the linear wiring member 22*b*. Here, a plurality of annular protrusions 34*bp* are formed so as to be spread out in the axial direction of the penetration portion 34*b*. When the portion of the linear wiring member 22*b* on the covering member 24 side is accommodated in the penetration portion 34*b*, the leading end portions of the annular protrusions 34*bp* come into areal contact with the periphery of the linear wiring member 22*b* while being elastically deformed. As a result, it is possible to inhibit the movement of water along the outer peripheral surface of the linear wiring member 22*b*.

The deep-side penetration portions 35 are through holes provided continuously with the covering member accommodating recess 33. Here, the plurality (two) of deep-side penetration portions 35 are holes penetrating from the bottom of the covering member accommodating recess 33 to the other end of the elastic waterproofing member 30. The plurality of deep-side penetration portions 35 are provided so as to correspond to the plurality of deep-side linear wiring members 23. Here, the plurality of deep-side penetration portions 35 are provided as two parallel portions so as to correspond to the two deep-side linear wiring members 23. In the following description, the penetration portion corresponding to the thicker deep-side linear wiring member 23*a* is sometimes referred to as the deep-side penetration portion 35*a*, and the penetration portion corresponding to the thinner deep-side linear wiring member 23*b* is sometimes referred to as the deep-side penetration portion 35*b*. The deep-side penetration portion 35*a* is larger than the deep-side penetration portion 35*b*.

The deep-side penetration portion 35*a* has the same shape as the above-described penetration portion 34*a*. The deep-side penetration portion 35*b* has the same shape as the above-described penetration portion 34*b*. The thicker deep-side penetration portion 35*a* is provided adjacent to the likewise thicker penetration portion 34*a*. The thinner deep-side penetration portion 35*b* is provided adjacent to the likewise thinner penetration portion 34*b*. Therefore, the thicker penetration portion 34*a* and the thicker deep-side penetration portion 35*a* are provided closer to one side of the elastic waterproofing member 30, and the thinner penetration portion 34*b* and the thinner deep-side penetration portion 35*b* are provided closer to the other side of the elastic waterproofing member 30.

With the end 24*a* of the covering member 24 accommodated in the covering member accommodating recess 33, the thicker linear wiring member 22*a* and the thicker deep-side linear wiring member 23*a* are accommodated in and penetrate the above-described penetration portion 34*a* and deep-side penetration portion 35*a*. Moreover, the thinner linear wiring member 22*b* and the thinner deep-side linear wiring member 23*b* are accommodated in and penetrate the penetration portion 34*b* and the deep-side penetration portion 35*b*. In this state, the end 24*a* of the covering member 24 and the portions of the linear wiring members 22 and the deep-side linear wiring members 23 that are close to the covering member 24 are waterproofed by the elastic waterproofing member 30. As a result, the ingress of water along the wiring member 20 is inhibited. In addition, the opening at the end 24*a* of the covering member 24 is located inward with respect to the waterproofed areas of the end 24*a* of the covering member 24 (especially the areas waterproofed by the covering member accommodating recess 33) and to the waterproofed areas of the portions of the linear wiring members 22 and the deep-side linear wiring member 23 that are close to the covering member 24 (especially the areas waterproofed by the penetration portions 34*a* and 34*b* and the deep-side penetration portions 35*a* and 35*b*). Therefore, the ingress of water through the opening of the end 24*a* of the covering member 24 is also inhibited.

The above-described elastic waterproofing member 30 includes the first split waterproofing member 36 and the second split waterproofing member 38. The first split waterproofing member 36 and the second split waterproofing member 38 are obtained by splitting the elastic waterproofing member 30 so as to longitudinally split the penetration accommodating portion 32. As used herein, "so as to longitudinally split the penetration accommodating portion 32" refers to the peripheral surface that forms the penetration accommodating portion 32 being split along a line from an opening at its one end to an opening at its other end. The line along which the peripheral surface forming the penetration accommodating portion 32 is split may be a straight line or bent at an intermediate portion.

Here, the elastic waterproofing member 30 is split into the first split waterproofing member 36 and the second split waterproofing member 38 so as to split the portion from the covering member accommodating recess 33 to the plurality of penetration portions 34*a* and 34*b*. Moreover, the elastic waterproofing member 30 is split such that the deep-side penetration portions 35*a* and 35*b* are provided on the side of the first split waterproofing member 36. More specifically, the split surface (interface) 45 that divides the first split waterproofing member 36 and the second split waterproofing member 38 includes central dividing surfaces 46 and outer peripheral portion dividing surfaces 47 (see FIGS. 5 and 7). The central dividing surfaces 46 divide portions of the elastic waterproofing member 30 close to its center. The outer peripheral portion dividing surfaces 47 are continuous with the two outer sides of the central dividing surfaces 46 and divide portions of the elastic waterproofing member 30 close to its outer peripheral surface.

The central dividing surfaces 46 divide portions of the elastic waterproofing member 30 close to its center so as to longitudinally divide the penetration accommodating portion 32. More specifically, the central dividing surfaces 46 include first central dividing surfaces 46*a* and second central dividing surfaces 46*b* (see FIG. 8).

The first central dividing surfaces 46*a* divide the portion of the elastic waterproofing member 30 in which the covering member accommodating recess 33 is formed. Here, the first central dividing surfaces 46*a* are provided at positions deviated from planes that bisect the covering member accommodating recess 33 along its axial direction. Here, the first central dividing surfaces 46*a* are provided along positions farther away from the deep-side penetration portions 35*a* and 35*b* than is the central axis of the covering member accommodating recess 33. As a result, a peripheral surface portion 33*f* exceeding a semicircle is formed in the first split waterproofing member 36 as a longitudinally split portion of the covering member accommodating recess 33 of the penetration accommodating portion 32 (see FIG. 8). Note that the first central dividing surfaces 46*a* may be deviated to the opposite side from the above-described such that a peripheral surface portion exceeding a semicircle is formed in the second split waterproofing member 38.

The second central dividing surfaces 46*b* divide the portion of the elastic waterproofing member 30 in which the penetration portions 34*a* and 34*b* are formed. Here, the second central dividing surfaces 46*b* are formed from one of the parallelly extending penetration portions 34*a* and 34*b* to the other. The second central dividing surfaces 46*b* are provided at positions deviated from planes that bisect the penetration portions 34a and 34b along their respective axial directions. Here, the second central dividing surfaces 46b are provided along positions farther away from the deep-side penetration portions 35a and 35b than are the central axes of the penetration portions 34a and 34b. As a result, peripheral surface portions 34af and 34bf exceeding a semicircle are formed in the first split waterproofing member 36 as longitudinally-split portions of the penetration portions 34a and 34b of the penetration accommodating portion 32 (see FIGS. 5 and 8). The peripheral surface portions 34af and 34bf are formed to be continuous with, and branch off from, the above-described peripheral surface portion 33f.

The central dividing surfaces 46 may be deviated to the opposite side of the central axis of the elastic waterproofing member 30 from the deep-side penetration portion 35a. In contrast, the outer peripheral portion dividing surfaces 47 are set along a plane that bisects the elastic waterproofing member 30 along the central axis of the elastic waterproofing member 30. Therefore, a protrusion 36a is formed protruding from the widthwise center of the first split waterproofing member 36 (see FIG. 5), and a recess 38a is formed recessed in the widthwise center of the second split waterproofing member 38. The protrusion 36a is formed to be increasingly narrower in the direction of protrusion, and the recess 38a is formed to be increasingly narrower the deeper it is. When the first split waterproofing member 36 and the second split waterproofing member 38 are joined together, the protrusion 36a is guided while being fitted into the recess 38a so as to suppress displacement between the first split waterproofing member 36 and the second split waterproofing member 38.

In the first split waterproofing member 36, the deep-side penetration portions 35a and 35b are provided further toward the deep side relative to the peripheral surface portions 34af and 34bf, which are part of the penetration portions 34a and 34b. Slits 39a and 39b that extend from the peripheral surface portions 34af and 34bf to the deep-side penetration portions 35a and 35b are formed in the first split waterproofing member 36. Here, the slit 39a is formed extending from the peripheral surface portion 34af, which is part of the penetration portion 34a, toward the deep-side penetration portion 35a along the direction parallel to the axial direction of the elastic waterproofing member 30. Moreover, the slit 39b is formed extending from the peripheral surface portion 34bf, which is part of the penetration portion 34b, toward the deep-side penetration portion 35b along the direction parallel to the axial direction of the elastic waterproofing member 30.

Additionally, before the first split waterproofing member 36 and the second split waterproofing member 38 are joined together, the end 24a of the covering member 24 is accommodated in the peripheral surface portion 33f, which is part of the covering member accommodating recess 33 of the first split waterproofing member 36. As the peripheral surface portion 33f has an opening on the split surface 45, the end 24a of the covering member 24 is easily pushed into the peripheral surface portion 33f via that opening. As the peripheral surface portion 33f is formed in a shape exceeding a semicircle, the width of the opening on the split surface 45 side is smaller than the diameter of the covering portion 24. As a result, with the end 24a of the covering member 24 accommodated in the peripheral surface portion 33f, the end 24a of the covering member 24 does not easily come out of the peripheral surface portion 33f.

The thicker deep-side linear wiring member 23a is also accommodated in the deep-side penetration portion 35a via the slit 39a from the peripheral surface portion 34af, which is part of the penetration portion 34a. Likewise, the thinner deep-side linear wiring member 23b is accommodated in the deep-side penetration portion 35b via the slit 39b from the peripheral surface portion 34bf, which is part of the penetration portion 34b.

Furthermore, the thicker linear wiring member 22a is accommodated in the peripheral surface portion 34af, which is part of the penetration portion 34a. Since the peripheral surface portion 34af has an opening on the split surface 45, the thicker linear wiring member 22a is easily pushed into the peripheral surface portion 34af via that opening. Since the peripheral surface portion 34af is formed in a shape exceeding a semicircle, the width of the opening on the split surface 45 side is smaller than the diameter of the thicker linear wiring member 22a. As a result, with the thicker linear wiring member 22a accommodated in the peripheral surface portion 34af, the thicker linear wiring member 22a does not easily come out of the peripheral surface portion 34af.

Likewise, the thinner linear wiring member 22b is accommodated in the peripheral surface portion 34bf, which is part of the penetration portion 34b. Since the peripheral surface portion 34bf has an opening on the split surface 45, the thinner linear wiring member 22b is easily pushed into the peripheral surface portion 34bf via that opening. Since the peripheral surface portion 34bf is formed in a shape exceeding a semicircle, the width of the opening on the split surface 45 side is smaller than the diameter of the thinner linear wiring member 22b. As a result, with the thinner linear wiring member 22b accommodated in the peripheral surface portion 34bf, the thinner linear wiring member 22b does not easily come out of the peripheral surface portion 34bf.

First outer annular protrusions 42 and second outer annular protrusions 43 are formed on the outer periphery of the elastic waterproofing member 30. The first outer annular protrusions 42 are formed on the portion of the outer periphery of the elastic waterproofing member 30 outside of the covering member accommodating recess 33. Preferably, the first outer annular protrusions 42 and the annular protrusions 33p are provided at least partially overlapping with each other in the axial direction of the elastic waterproofing member 30. The first outer annular protrusions 42 are formed in annular shapes that protrude along the circumferential direction on the outer peripheral side portion of the cylindrical portion 30a of the elastic waterproofing member 30. Here, a plurality of first outer annular protrusions 42 are formed. The second outer annular protrusions 43 are formed on the portion of the outer periphery of the elastic waterproofing member 30 outside of the penetration portions 34a and 34b and the deep-side penetration portions 35a and 35b. Preferably, the second outer annular protrusions 43 and the annular protrusions 34ap and 34bp are provided at least partially overlapping with each other in the axial direction of the elastic waterproofing member 30. The second outer annular protrusions 43 are formed in annular shapes that protrude along the circumferential direction on the outer peripheral portion of the cylindrical portion 30a of the elastic waterproofing member 30. Here, a plurality of second outer annular protrusions 43 are formed.

A first set protrusion 48 is formed on the first split waterproofing member 36. The first set protrusion 48 protrudes from the portion of the first split waterproofing member 36 opposite to the split surface 45. The first set protrusion 48 includes a base 48a and a head 48b. The base 48a protrudes from the outer periphery of the first split waterproofing member 36. The head 48b protrudes toward the outer peripheral side of the base 48a from the leading end of the base 48a. The head 48b is formed in a shape that is not circular, such as an oval shape, for example. This head 48b is fitted into a first set recess 57 in the exterior member 50.

A second set protrusion 49 is formed on the second split waterproofing member 38. The second set protrusion 49 protrudes from the portion of the second split waterproofing member 38 opposite to the split surface 45. The second set protrusion 49 includes a base 49a and a head 49b. The base 49a protrudes from the outer periphery of the second split waterproofing member 38. The head 49b protrudes toward the outer peripheral side of the base 49a from the leading end of the base 49a. This head 49b is fitted into a second set recess 67 in the exterior member 50. Here, the first set protrusion 48 and the second set protrusion 49 have the same shape. The first set protrusion 48 and the second set protrusion 49 may have different shapes.

As described above, with a portion in the longitudinal direction of the wiring member 20 accommodated in the deep-side penetration portions 35a and 35b of the first split waterproofing member 36, the peripheral surface portions 34af and 34bf of the penetration portions 34a and 34b, and the peripheral surface portion 33f of the covering member accommodating recess 33, the first split waterproofing member 36 and the second split waterproofing member 38 are joined together. In this way, with a portion in the longitudinal direction of the wiring member 20 accommodated in the penetration accommodating portion 32, the first split waterproofing member 36 and the second split waterproofing member 38 are kept in the joined state. In the present embodiment, the joined state is maintained by the exterior member 50.

The exterior member 50 is a member capable of fulfilling a role of covering the periphery of the elastic waterproofing member 30 and keeping the first split waterproofing member 36 and the second split waterproofing member 38 in the joined state. In the present embodiment, the exterior member 50 includes a first exterior member 52 and a second exterior member 62 that can be joined together. When the first exterior member 52 and the second exterior member 62 are joined together, the elastic waterproofing member 30 is accommodated therebetween. The force that tends to keep the first exterior member 52 and the second exterior member 62 in the joined state compresses the elastic waterproofing member 30, thereby keeping the first split waterproofing member 36 and the second split waterproofing member 38 in the joined state.

More specifically, the first exterior member 52 and the second exterior member 62 are both members made of a resin or the like.

The first exterior member 52 includes a bottom plate portion 53 and a pair of side wall portions 54. The bottom plate portion 53 is formed in the shape of a square plate. The pair of side wall portions 54 are provided in a standing manner on both sides of the bottom plate portion 53. Joining protrusions 54p are formed on the external surfaces of the side wall portions 54. The joining protrusions 54p are formed in a shape whose protruding dimension gradually decreases toward the leading end on the side wall portion 54. Guide protrusions 54q are formed on both lateral sides of the joining protrusions 54p. The guide protrusions 54q are formed in an elongated shape extending from a base end toward a leading end on the side wall portions 54.

A waterproofing member split holding surface 55f having a half-circumferential surface shape is formed in an intermediate portion in the longitudinal direction of the bottom plate portion 53. The portion of the first split waterproofing member 36 corresponding to the cylindrical portion 30a is accommodated in the waterproofing member split holding surface 55f.

A first positioning portion 55a is provided at one end of the waterproofing member split holding surface 55f. The first positioning portion 55a is formed in a U-shape protruding inward relative to the inner peripheral surface of the waterproofing member split holding surface 55f. A recess in which the covering member 24 can be disposed is provided in the first positioning portion 55a. A half-cylindrical holding portion 56a that can accommodate the covering member 24 is formed at one end of the bottom plate portion 53. The half-cylindrical holding portion 56a is positioned outside of the first positioning portion 55a. Protrusions are formed on the inner peripheral surface of the half-cylindrical holding portion 56a along its circumferential direction. Of the portion of the wiring member 20 that extends out of the elastic waterproofing member 30 (or the first split waterproofing member 36), the covering member 24 passes through the first positioning portion 55a and is held in the half-cylindrical holding portion 56a.

A second positioning portion 55b is provided at the other end of the waterproofing member split holding surface 55f. The second positioning portion 55b is formed in a U-shape protruding inward relative to the inner peripheral surface of the waterproofing member split holding surface 55f. A recess in which the part of the first split waterproofing member 36 corresponding to the extension portion 30b can be disposed is provided in the second positioning portion 55b. A partition 55c passing through an intermediate portion in the width direction of the second positioning portion 55b protrudes from the bottom plate portion 53 on the outside of the second positioning portion 55b. Of the portion of the linear wiring members 22 and the deep-side linear wiring members 23 that extend out of the elastic waterproofing member 30 (or the first split waterproofing member 36), the thicker linear wiring member 22a and the thicker deep-side linear wiring member 23a are separated from the thinner linear wiring member 22b and the thinner deep-side linear wiring member 23b by the partition 55c as they protrude outward.

A first set recess 57 is formed in the waterproofing member split holding surface 55f of the bottom plate portion 53. The first set recess 57 is formed in a shape in which the above-described first set protrusion 48 can be fitted. Here, the first set recess 57 is formed in an oval shape conforming to the first set protrusion 48. The first set recess 57 need only be recessed in a view from the waterproofing member split holding surface 55f, and may be a bottomed hole or a through hole. Here, the first set recess 57 is a through hole penetrating the waterproofing member split holding surface 55f to the outside. The first set protrusion 48 is preferably configured to be press-fitted into the first set recess 57 so that the first split waterproofing member 36 does not easily come out of the first exterior member 52.

The first split waterproofing member 36 is set in the above-described waterproofing member split holding surface 55f with the first set protrusion 48 fitted in the first set recess 57. In this state, the half-cylindrical portion of the first split waterproofing member 36 that corresponds to the cylindrical portion 30a is accommodated in the waterproofing member split holding surface 55f. In this state, one end face of the first split waterproofing member 36 is placed in contact with the first positioning portion 55a. Also, the portion of the first split waterproofing member 36 that corresponds to the extension portion 30b is accommodated in the second positioning portion 55b, and an outward step at the portion of the first split waterproofing member 36 corresponding to the boundary between the cylindrical portion 30a and the extension portion 30b is in contact with the second positioning portion 55b. As a result, the first split waterproofing member 36 is positioned in its axial direction with respect to the first exterior member 52. The split surface 45 is formed in the portion of the first split waterproofing member 36 opposite to the first set protrusion 48. As a result, the split surface 45 of the first split waterproofing member 36 is exposed to the outside on the opposite side to the bottom plate portion 53. In this way, with the split surface 45 exposed, the first exterior member 52 is capable of holding the first split waterproofing member 36.

The second exterior member 62 includes a ceiling plate portion 63 and a pair of side wall portions 64. Similar to the above-described bottom plate portion 53, the ceiling plate portion 63 is formed in the shape of a rectangular plate. The pair of side wall portions 64 protrude from both sides of the ceiling plate portion 63. Joining recesses 64pa are formed on the external surfaces of the side wall portions 64. Here, joining elongated pieces 64p are formed from the external surfaces of the side wall portions 64 toward the leading ends thereof. The joining recesses 64pa, in which the above-described joining protrusions 54p can be disposed, are formed at the leading ends of the joining elongated pieces 64p. When the second exterior member 62 is disposed on top of the first exterior member 52, the leading edges of the pair of the side wall portions 54 and the leading edges of the pair of side wall portions 64 are disposed opposing each other. Note that the overlapping pieces on the leading ends of the pair of side wall portions 64 are fitted on the outside of the leading edges of the pair of side wall portions 54. In this state, the leading ends of the joining elongated pieces 64p go over the joining protrusions 54p, and the joining protrusions 54p fit in the joining recesses 64pa. As a result, the joining protrusions 54p are caught and retained in the joining elongated pieces 64pa, whereby the first exterior member 52 and the second exterior member 62 are kept in the joined state.

A waterproofing member split holding surface 65f having a half-circumferential surface shape is formed in an intermediate portion in the longitudinal direction of the ceiling plate portion 63. The portion of the second split waterproofing member 38 corresponding to the cylindrical portion 30a is accommodated in the waterproofing member split holding surface 65f. The cylindrical portion 30a of the elastic waterproofing member 30 is accommodated in the cylindrical space defined by the above-described waterproofing member split holding surface 55f and waterproofing member split holding surface 65f.

When the first exterior member 52 and the second exterior member 62 are joined together, the distance between the deep portion of the waterproofing member split holding surface 55f and the deep portion of the waterproofing member split holding surface 65f is smaller than the diameter of the first outer annular protrusions 42 and the second outer annular protrusions 43 on the cylindrical portion 30a. Furthermore, the radius of curvature of the waterproofing member split holding surfaces 55f and 65f is smaller than the radius of the first outer annular protrusions 42 and the second outer annular protrusions 43 on the cylindrical portion 30a. As a result, when the first outer annular protrusions 42 and the second exterior member 62 are joined together, a contractive force acts on the first outer annular protrusions 42 and the second outer annular protrusions 43 of the cylindrical portion 30a. This contractive force acts on the elastic waterproofing member 30 as a force to clamp the first split waterproofing member 36 and the second split waterproofing member 38 together in the joining direction.

A first positioning portion 65a is provided at one end of the waterproofing member split holding surface 65f. The first positioning portion 65a is formed in an arc shape protruding inward relative to the inner peripheral surface of the waterproofing member split holding surface 65f. The first positioning portion 65a comes into contact with the annular area on one end face of the second split waterproofing member 38 so as to position the second split waterproofing member 38. A half-cylindrical holding portion 66a that has the same configuration as the half-cylindrical holding portion 56a is formed on one end of the ceiling plate portion 63. When the first exterior member 52 and the second exterior member 62 are joined together, the half-cylindrical holding portions 56a and 66a sandwich and hold the covering member 24.

A partition wall portion 65b is provided at the other end of the waterproofing member split holding surface 65f. A recess in which the above-described second positioning portion 55b and extension portion 30b can be disposed is provided in the partition wall portion 65b. When the first exterior member 52 and the second exterior member 62 are joined together, the second positioning portion 55b and the extension portion 30b are disposed in the recess in the partition wall portion 65b. In this state, the partition wall portion 65b partitions the exterior member 50 into inside and outside spaces. The partition wall portion 65b protrudes from the waterproofing member split holding surface 65f.

A second set recess 67 is formed on the waterproofing member split holding surface 65f of the ceiling plate portion 63. Similar to the relationship of the first set recess 57 with the first set recess 48, the second set recess 67 is formed in a shape in which the above-described second set protrusion 49 can be fitted.

The second split waterproofing member 38 is set in the above-described waterproofing member split holding surface 65f with the second set protrusion 49 fitted in the second set recess 67. In this state, the half-cylindrical portion of the second split waterproofing member 38 that corresponds to the cylindrical portion 30a is accommodated in the waterproofing member split holding surface 65f. In this state, one end face of the second split waterproofing member 38 is in contact with the first positioning portion 65a. Also, the portion of the second split waterproofing member 38 that corresponds to the extension portion 30b is accommodated in the partition wall portion 65b, and an outward step at the portion of the second split waterproofing member 38 corresponding to the boundary between the cylindrical portion 30a and the extension portion 30b is in contact with the partition wall portion 65b. As a result, the second split waterproofing member 38 is positioned in its axial direction with respect to the second exterior member 62. The split surface 45 is formed in the portion of the second split waterproofing member 38 opposite to the second set protrusion 49. As a result, the split surface 45 of the second split waterproofing member 38 is exposed to the outside on the side opposite to the ceiling plate portion 63. In this way, with the split surface 45 exposed, the second exterior member 62 is capable of holding the second split waterproofing member 38.

An exemplary method of manufacturing the wiring module 10 configured in this manner will be described.

A wiring member 20 with linear wiring members 22 and deep-side linear wiring members 23 extending from one end of a covering member 24 is prepared.

The first split waterproofing member 36 is set in the first exterior member 52 so as to fit the first set protrusion 48 in the first set recess 57. In this state, as shown in FIG. 8, the split surface 45 of the first split waterproofing member 36 faces opposite to the bottom plate portion 53. Therefore, the slit-shaped openings in the split surface 45 of the penetration accommodating portion 32 are exposed to the side opposite to the bottom plate portion 53.

In the above-described state, the end 24a of the covering member 24 is pushed into the peripheral surface portion 33f so as to be accommodated in the peripheral surface portion 33f (see the arrow P1 in FIG. 8). Furthermore, the deep-side linear wiring members 23a and 23b are pushed into the peripheral surface portions 34af and 34bf (see the arrows P2 and P3 in FIG. 8) and then accommodated in the deep-side penetration portions 35a and 35b via the slits 39a and 39b, which are located deeper. Subsequently, the linear wiring members 22a and 22b are pushed into the peripheral surface portions 34af and 34bf and then accommodated in these peripheral surface portions 34af and 34bf. As a result, part of the wiring member 20 is accommodated in the portion of the penetration accommodating portion 32 that is formed in the first split waterproofing member 36. In this state, since the peripheral surface portions 33f, 34af, and 34bf are formed in a shape exceeding a semicircle, the wiring member 20 does not easily come out of the first split waterproofing member 36.

Separately from the above, the second split waterproofing member 38 is set in the second exterior member 62 so as to fit the second set protrusion 49 in the second set recess 67. In this state, the split surface 45 of the second split waterproofing member 38 faces opposite to the ceiling plate portion 63.

Subsequently, the second exterior member 62 and the second split waterproofing member 38 are disposed on the first exterior member 52 and the first split waterproofing member 36 (see the arrow P4 in FIG. 8), and the joining protrusions 54p are caught and retained in the joining recesses 64pa. As a result, the first exterior member 52 and the second exterior member 62 are kept in the joined state. Then, the cylindrical portion 30a is compressed within the waterproofing member split holding surfaces 55f and 65f, keeping the first split waterproofing member 36 and the second split waterproofing member 38 in the joined state.

The wiring module 10 configured in this manner can be used, for example, as wiring for a suspension system in a vehicle, such as wiring for an ABS (anti-lock braking system). Since such wiring can be used outside of the vehicle in environments where it is exposed to water, it is useful to provide improved waterproofing performance as described above.

According to the wiring module 10 and the elastic waterproofing member 30 configured in this manner, when the first split waterproofing member 36 and the second split waterproofing member 38 are split from each other, a longitudinal portion of the wiring member 20 can be accommodated in the longitudinally-split penetration accommodating portion 32. Subsequently, the elastic waterproofing member 30 can be easily attached to the wiring member 20 by joining the first split waterproofing member 36 and the second split waterproofing member 38 together. As a result, it is not necessary to insert the wiring member into the through holes in the axial direction, enabling the elastic waterproofing member 30 to be easily attached to the wiring member 20.

Additionally, at least one of the first split waterproofing member 36 and the second split waterproofing member 38 includes the peripheral surface portions 33f, 34af, and 34bf, which exceed semicircles, as portions where the penetration accommodating portion 32 is longitudinally split. Therefore, the end 24a of the covering member 24, the linear wiring members 22a and 22b, and the like of the wiring member 20 are provisionally held in the peripheral surface portions 33f, 34af, and 34bf with ease. In this state, the first split waterproofing member 36 and the second split waterproofing member 38 can be joined together. As a result, during the task of joining, the wiring member 20 does not easily come out of the first split waterproofing member 36 or the second split waterproofing member 38, making the task of joining easy. Note that peripheral surface portions exceeding a semicircle may be formed in both the first split waterproofing member and the second split waterproofing member for different penetration portions.

Furthermore, the covering member accommodating recess 33 and the plurality of penetration portions 34a and 34b are formed in the elastic waterproofing member 30. The elastic waterproofing member 30 is split into the first split waterproofing member 36 and the second split waterproofing member 38 so as to split the portion from the covering member accommodating recess 33 to the plurality of penetration portions 34a and 34b. As a result, in a configuration in which the plurality of linear wiring members 22a and 22b extend from the covering member 24, the split structure of the first split waterproofing member 36 and the second split waterproofing member 38 can be used to accommodate the end 24a of the covering member 24 in the covering member accommodating recess 33 and accommodate the linear wiring members 22a and 22b in the penetration portions 34a and 34b. As a result, each of the end 24a of the covering member 24 and the plurality of linear wiring members 22a and 22b can be separately waterproofed. In this case, the ingress of water through the opening of the end 24a of the covering member 24 can be effectively inhibited.

Moreover, the slits 39a and 39b are formed from the penetration portions 34a and 34b to the deep-side penetration portions 35a and 35b. As a result, the deep-side linear wiring member 23a and 23b can be disposed in the deep-side penetration portions 35a and 35b, which are located on the deep side with respect to the split surface 45. As such, it is possible to separately waterproof the multiple wiring members 22a, 22b, 23a, and 23b without forming split surfaces that pass through all of the multiple penetration portions. Furthermore, since no slits are formed directly from the deep-side penetration portions 35a and 35b to the outside of the elastic waterproofing member 30, the waterproofing performance can be improved.

Additionally, since the first split waterproofing member 36 and the second split waterproofing member 38 are kept in the joined state by accommodating the elastic waterproofing member 30 between the first exterior member 52 and the second exterior member 62 and joining these together, the wiring module 10 can be manufactured easily.

Moreover, since the first split waterproofing member 36 is set in the first exterior member 52 with the split surface 45 exposed, the wiring member 20 can easily be provisionally held in the first split waterproofing member 36, which is held in the first exterior member 52. That is, it is conceivable that the first split waterproofing member 36 may not be easily held for at least one of the reasons given below. For example, the first split waterproofing member 36 may be too small to hold. Also, the first split waterproofing member 36 may be made of a slippery material, such as silicone rubber. In such cases, while holding the first split waterproofing member 36 together with the first exterior member 52, a portion in the longitudinal direction of the wiring member 20 can be pushed into the peripheral surface portions 33f,

34af, and 34bf so as to be provisionally held in the first split waterproofing member 36. As a result, the elastic waterproofing member 30 can be easily attached to the wiring member 20.

Further, when the second split waterproofing member 38 is set in the second exterior member 62, the first split waterproofing member 36 and the second split waterproofing member 38 can be easily joined together by joining the first exterior member 52 and the second exterior member 62.

Variations

Figure 9:
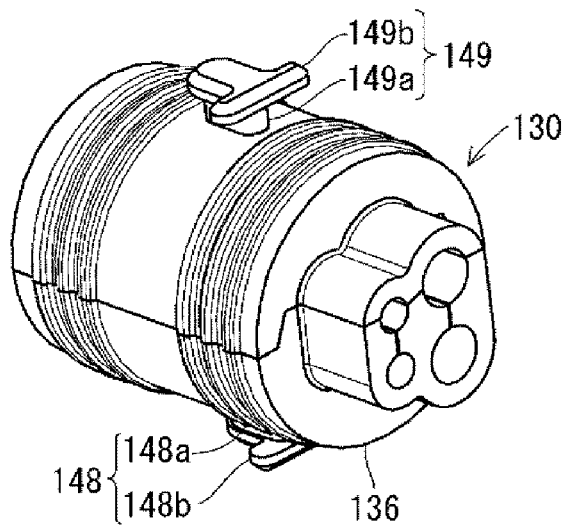
FIG. 9 is a perspective view showing an elastic waterproofing member of a first variation.
Figure 10:
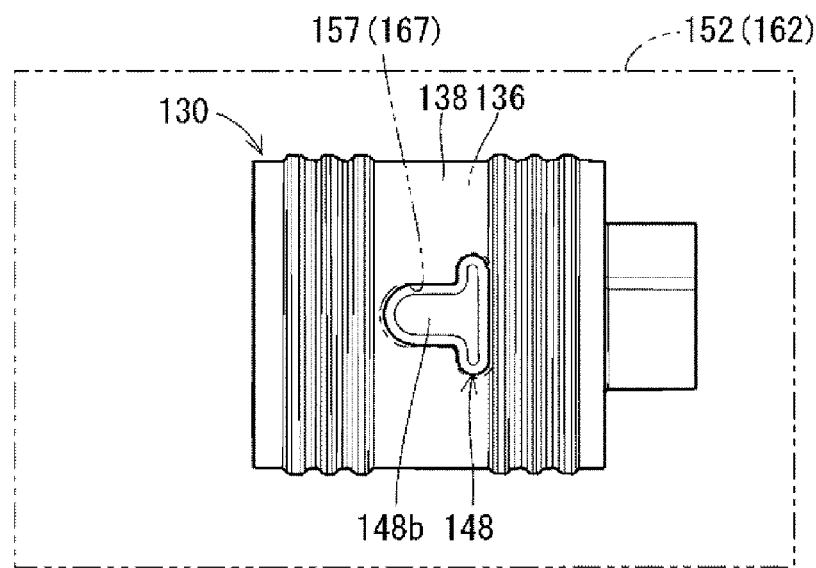
FIG. 10 is a bottom view showing the elastic waterproofing member.

FIG. 9 is a perspective view showing an elastic waterproofing member 130 of a first variation. FIG. 10 is a bottom view showing the elastic waterproofing member 130. In FIG. 10, the general form of a first exterior member 152 is indicated by two-dot chain lines.

This elastic waterproofing member 130 is different from the elastic waterproofing member 30 in that it includes a first set protrusion 148 instead of the first set protrusion 48 and it includes a second set protrusion 149 instead of the second set first set protrusion 49.

The first set protrusion 148 includes a base 148a and a head 148b. In the elastic waterproofing member 130, the base 148a protrudes from the outer periphery of a first split waterproofing member 136 that corresponds to the first split waterproofing member 36. The head 148b protrudes toward the outer peripheral side of the base 148a from the leading end of the base 148a. The head 148b is formed in a shape not having rotational symmetry when observed from the outside of the elastic waterproofing member 130. Here, the head 148b is formed in a T-shape with a horizontal bar portion continuous with one end of a longitudinal bar portion when observed from the outside of the elastic waterproofing member 130. The longitudinal bar portion extends in parallel with the axial direction of the elastic waterproofing member 30. The horizontal bar portion extends in the width direction of the elastic waterproofing member 30 (in the direction orthogonal to both the axial direction of the elastic waterproofing member 130 and the direction that connects the first set protrusion 148 and the second set protrusion 149) from the end of the longitudinal bar portion closer to the penetration portions 34a and 34b.

A first set recess 157 is formed instead of the first set recess 57 in a first exterior member 152 corresponding to the first exterior member 52. The first set recess 157 is formed in a shape in which the first set protrusion 148 can be fitted only in a single first position. Here, the first set recess 157 is formed in a T-shape with a horizontal recess continuous with one end of a longitudinal recess, similar to the above-described first set protrusion 148. The longitudinal recess extends in parallel with the longitudinal direction of the first exterior member 152 (the axial direction of the half-cylindrical holding portion 56a, see FIG. 2). The horizontal recess extends parallel to the width direction of the first exterior member 152 (the width direction of the half-cylindrical holding portion 56a) from the end of the longitudinal recess closer to the first positioning portion 55a (see FIG. 2). The first set recess 157 may be formed in the same shape and the same size as the above-described first set protrusion 148, or may be formed in a smaller shape than the first set protrusion 148 as long as the first set protrusion 148 can be press-fitted in it.

In the elastic waterproofing member 130, similar to the first set protrusion 148, the set protrusion 149 protrudes from the outer periphery of a second split waterproofing member 138 that corresponds to the second split waterproofing member 38. The second set protrusion 149 is formed in a shape with a base 149a corresponding to the base 148a and a head 149b corresponding to the head 148b. Also, a second set recess 167 is formed instead of the second set recess 67 in the second exterior member 62. The head 149b is formed in the same shape as the head 148b, and the second set recess 167 is formed in the same shape as the above-described first set recess 157. Therefore, the second protrusion 149 is also fitted into the second set recess 167 only in a predetermined second position.

According to the present variation, since the first set protrusion 148 can be fitted into the first set recess 157 only in the predetermined first position, the first split waterproofing member 136 is set with respect to the first exterior member 152 only in a predetermined normal position. Likewise, since the second set protrusion 149 can be fitted into the second set recess 167 only in the predetermined second position, the second split waterproofing member 138 is set with respect to the second exterior member 162 only in a predetermined normal position. Therefore, by joining the first exterior member 152 and the second exterior member 162 in a correct position while checking the external shapes of the first exterior member 152 and the second exterior member 162, the first split waterproofing member 136 and the second split waterproofing member 138 contained therein are joined together in a correct position.

This ensures that the first split waterproofing member 136 and the second split waterproofing member 138, which are hidden in the first exterior member 152 and the second exterior member 162 and thus difficult to see, are also joined together in a correct position, ensuring the waterproofing performance by the first split waterproofing member 136 and the second split waterproofing member 138.

Figure 11:
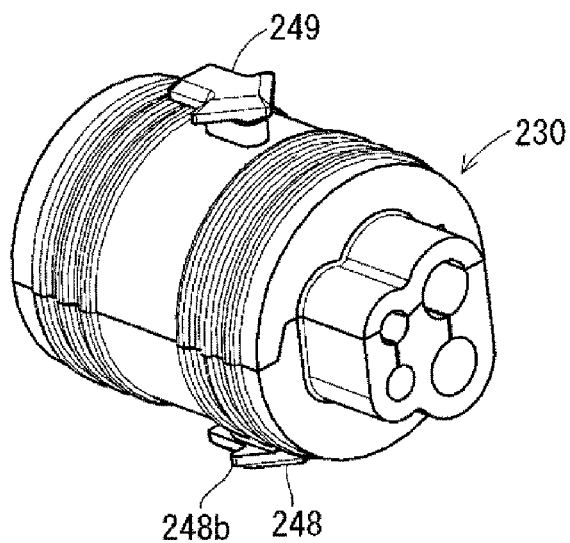
FIG. 11 is a perspective view showing an elastic waterproofing member of a second variation.

The shapes of the first set protrusion 148 and the first set recess 157 and the shapes of the second set protrusion 149 and the second set recess 167 are not limited to the above-described examples. For example, as in an elastic waterproofing member 230 of a second variation shown in FIG. 11, a head 248b of a first set protrusion 248 may have an arrow shape. Here, the head 248b is formed in a shape in which a triangular portion is continuous with one end of a rectangular portion. A second set protrusion 249 is also formed in the same shape as the first set protrusion 248. In this case, a first set recess into which the first set protrusion 248 is fitted and a second set recess into which the second set protrusion 249 is fitted are preferably formed in an arrow shape as described above.

Figure 12:
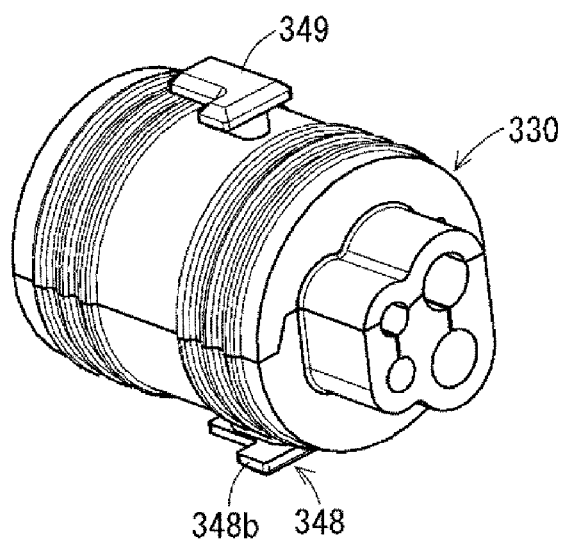
FIG. 12 is a perspective view showing an elastic waterproofing member of a third variation.

Furthermore, for example, as in an elastic waterproofing member 330 of a third variation shown in FIG. 12, a head 348b of a first set protrusion 348 may have an L-shape. Here, the head 348b is formed in a shape in which a horizontal bar portion is continuous with one end of a longitudinal bar portion and extends to one side thereof. The length of the longitudinal portion is different from that of the horizontal bar portion, and here, the horizontal portion is shorter than the longitudinal bar portion. In this case, a first set recess into which the first set protrusion 348 is fitted and a second set recess into which a second set protrusion 349 is fitted are preferably formed in an L-shape as described above.

In these second and third variations, it is ensured that the first split waterproofing member and the second split waterproofing member are also joined together in a correct position in the exterior member so as to ensure the waterproofing performance.

Note that in the above-described embodiment and the variations, the first set protrusions 48, 148, 248, and 348 may have different shapes from the second set protrusions 49, 149, 249, and 349. For example, the first set protrusion 148 and the second set protrusion 249 may be used in the same elastic waterproofing member.

Also, although examples have been described in the above-described embodiment and the variations in which the first set protrusion is formed in the first split waterproofing member and the first set recess is formed in the exterior member, the recess/protrusion relationship may be reversed. That is, for example, instead of the first set protrusion, a first set recess in the shape of a bottomed recess may be formed in the first split waterproofing member of the elastic waterproofing member, and instead of the first set recess, a first set protrusion that protrudes inwardly may be formed in the first exterior member. Similarly, instead of the second set protrusion, a second set recess in the shape of a bottomed recess may be formed in the second split waterproofing member of the elastic waterproofing member, and instead of the second set recess, a second set protrusion that protrudes inwardly may be formed in the second exterior member.

It should be noted that the configurations described in the foregoing embodiments and the variations can be combined as appropriate as long as they are compatible with one another.

LIST OF REFERENCE NUMERALS

10 Wiring module
20 Wiring member
22 (22a, 22b) Linear wiring member
23 (23a, 23b) Deep-side linear wiring member
24 Covering member
24a End
30, 130, 230, 330 Elastic waterproofing member
30a Cylindrical portion
30b Extension portion
32 Penetration accommodating portion
33 Covering member accommodating recess
33f Peripheral surface portion
33p Annular protrusion
34 (34a, 34b) Penetration portion
34af, 34bf Peripheral surface portion
34ap, 34bp Annular protrusion
35 (35a, 35b) Deep-side penetration portion
36, 136 First split waterproofing member
36a Protrusion
38, 138 Second split waterproofing member
38a Recess
39a, 39b Slit
42 First outer annular protrusion
43 Second outer annular protrusion
45 Split surface
46 Central dividing surface
46a First central dividing surface
46b Second central dividing surface
47 Outer peripheral portion dividing surface
48, 148, 248, 348 First set protrusion
48a, 148a Base
48b, 148b, 248b, 348b Head
49, 149, 249, 349 Second set protrusion
49a, 149a Base
49b, 149b Head
50 Exterior member
52, 152 First exterior member
53 Bottom plate portion
54, 64 Side wall portion
54p Joining protrusion
54q Guide protrusion
55a, 65a First positioning portion
55b, 65b Second positioning portion
55c Partition
55f, 65f Waterproofing member split holding surface
56a, 66a Half-cylindrical holding portion
57, 157 First set recess
62, 162 Second exterior member
63 Ceiling plate portion
64p Joining elongated piece
64pa Joining recess
67, 167 Second set recess

What is claimed is:

1. A wiring module, comprising:
   a wiring member; and
   an elastic waterproofing member in which a penetration accommodating portion is formed that is capable of accommodating a portion in a longitudinal direction of the wiring member,
   wherein
   the elastic waterproofing member includes a first split waterproofing member and a second split waterproofing member,
   the first split waterproofing member and the second split waterproofing member are members obtained by splitting the elastic waterproofing member so as to longitudinally split the penetration accommodating portion,
   the first split waterproofing member and the second split waterproofing member are kept in a joined state with a portion in the longitudinal direction of the wiring member accommodated in the penetration accommodating portion,
   the penetration accommodating portion includes
     a penetration portion capable of accommodating a portion in a longitudinal direction of a linear wiring member of the wiring member, and
     a deep-side penetration portion capable of accommodating a portion in a longitudinal direction of a deep-side linear wiring member of the wiring member, and
   the elastic waterproofing member is split such that the deep-side penetration portion is provided in the first split waterproofing member.

2. The wiring module according to claim 1, wherein at least one of the first split waterproofing member and the second split waterproofing member includes a peripheral surface portion exceeding a semicircle, as a portion where the penetration accommodating portion is longitudinally split.

3. The wiring module according to claim 1, wherein
   the wiring member includes a plurality of linear wiring members and a covering member that covers the plurality of linear wiring members, and the plurality of linear wiring members extend from an end of the covering member,
   the penetration accommodating portion includes a covering member accommodating recess that covers the end of the covering member and a plurality of penetration portions continuous with the covering member accommodating recess,
   the plurality of penetration portions are provided so as to correspond to the plurality of linear wiring members, and
   the elastic waterproofing member is split into the first split waterproofing member and the second split waterproofing member so as to split a portion from the covering member accommodating recess to the plurality of penetration portions.

4. The wiring module according to claim 1,
wherein the wiring member includes the linear wiring member corresponding to the penetration portion of the penetration accommodating portion, and the deep-side linear wiring member corresponding to the deep-side penetration portion of the penetration accommodating portion, and
wherein a slit is formed in the first split waterproofing member from the penetration portion to the deep-side penetration portion.

5. The wiring module according to claim 1, further comprising
an exterior member including a first exterior member and a second exterior member that can be joined together,
wherein when the first exterior member and the second exterior member are joined together, the first split waterproofing member and the second split waterproofing member are joined together and accommodated between the first exterior member and the second exterior member.

6. The wiring module according to claim 5, wherein the first exterior member holds the first split waterproofing member with a split surface of the first split waterproofing member exposed.

7. The wiring module according to claim 6, wherein the second exterior member holds the second split waterproofing member with a split surface of the second split waterproofing member exposed.

8. The wiring module according to claim 7, wherein
a first set protrusion is formed on one of the first split waterproofing member and the first exterior member, and a first set recess in which the first set protrusion can be fitted in a first position is formed in the other, and
a second set protrusion is formed on one of the second split waterproofing member and the second exterior member, and a second set recess in which the second set protrusion can be fitted in a second position is formed in the other.

9. An elastic waterproofing member to be attached to a wiring member, wherein
a penetration accommodating portion is formed that is capable of accommodating a portion in a longitudinal direction of the wiring member,
the elastic waterproofing member includes a first split waterproofing member and a second split waterproofing member obtained by splitting the elastic waterproofing member so as to longitudinally split the penetration accommodating portion,
the penetration accommodating portion includes
a penetration portion capable of accommodating a portion in a longitudinal direction of a linear wiring member of the wiring member, and
a deep-side penetration portion capable of accommodating a portion in a longitudinal direction of a linear wiring member different from the linear wiring member of the wiring member, and
the elastic waterproofing member is split such that the deep-side penetration portion is provided in the first split waterproofing member.

10. The elastic waterproofing member according to claim 9, wherein at least one of the first split waterproofing member and the second split waterproofing member includes a peripheral surface portion exceeding a semicircle, as a portion where the penetration accommodating portion is longitudinally split.

11. The elastic waterproofing member according to claim 9,
wherein the penetration accommodating portion further includes a covering member accommodating recess that is open on one side and a plurality of penetration portions continuous with a deep side of the covering member accommodating recess, and
wherein the splitting of the elastic waterproofing member into the first split waterproofing member and the second split waterproofing member serves to split a portion from the covering member accommodating recess to the plurality of penetration portions.

12. The elastic waterproofing member according to claim 9, wherein a slit is formed in the first split waterproofing member from the penetration portion to the deep-side penetration portion.

* * * * *